(12) United States Patent
Haardt

(10) Patent No.: US 6,317,586 B1
(45) Date of Patent: Nov. 13, 2001

(54) METHOD AND BASE STATION FOR DATA TRANSMISSION IN A WIRELESS COMMUNICATIONS SYSTEM

(75) Inventor: Martin Haardt, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/239,421

(22) Filed: Jan. 28, 1999

(30) Foreign Application Priority Data

Jan. 28, 1998 (DE) .............................................. 198 03 188

(51) Int. Cl.⁷ ...................................................... H04B 1/10
(52) U.S. Cl. .......................... 455/67.6; 455/67.6; 455/63; 455/67.3
(58) Field of Search ................... 455/67.6, 561, 455/63; 370/342

(56) References Cited

U.S. PATENT DOCUMENTS

| | | | |
|---|---|---|---|
| 5,970,060 | * 10/1999 | Baier et al. | 370/342 |
| 6,084,967 | * 7/2000 | Kennedy et al. | 380/247 |
| 6,091,361 | * 7/2000 | Davis et al. | 342/378 |
| 6,101,399 | * 8/2000 | Raleigh et al. | 455/561 |
| 6,225,948 | 5/2001 | Baier et al. . | |

FOREIGN PATENT DOCUMENTS

WO 97/24892   7/1997 (WO) .

OTHER PUBLICATIONS

"A Comparison of Two Different Algorithms for Multi Antenna C/I Balancing", Ralph Schmalenberger et al., Research Group for RF Communications, University of Kaiserslautern, pp. 1–7.

"Space–Time Processing for Wireless Communications", Aroguaswami J. Paulraj et al., Ieee Signal Processing Magazine, Nov. 1997, pp. 49–83.

\* cited by examiner

Primary Examiner—Daniel Hunter
Assistant Examiner—Alan Gantt
(74) Attorney, Agent, or Firm—Herbert L. Lerner; Laurence A. Greenberg; Werner H. Stemer

(57) ABSTRACT

Space covariance matrices are first defined for a $k^{th}$ link from the base station to a wireless station and for a sum of further radio stations, that is to say, in the latter case, the interference for the $k^{th}$ link. In a second step, a beam forming vector $w^{(k)}$ is calculated for the link such that the signal-to-noise ratio in the receiver is maximized. A general intrinsic value problem is thereby solved without iterations. Transmission signals are then weighted with the beam forming vector for the link, and are supplied to the antenna elements for transmission. The method is suitable for TDMA/CDMA and CDMA transmission methods using smart antennas.

13 Claims, 6 Drawing Sheets

METHOD AND BASE STATION FOR DATA TRANSMISSION IN A WIRELESS COMMUNICATIONS SYSTEM

BACKGROUND OF THE INVENTION

1. Field of the Invention

The invention lies in the telecommunications field. More specifically, the invention relates to a method and a base station for data transmission in a wireless communications system, wherein a base station has an associated antenna device with a plurality of antenna elements, so that spatial resolution in a beam formation can be carried out.

In wireless (radio) communications systems, messages (for example voice, video information or other data) are transmitted with the aid of electromagnetic waves via a radio interface between a transmitting and a receiving station (base station and mobile, respectively). The electromagnetic waves are thereby transmitted at carrier frequencies which are in the frequency band laid out for the respective system. In the case of GSM (Global System for Mobile Communication), the carrier frequencies are in the region of 900, 1800 or 1900 MHz. For future mobile radio networks using CDMA or TD/CDMA transmission methods via the radio interface, for example the UMTS (Universal Mobile Telecommunication System) or other 3rd generation systems, frequencies in the frequency band of about 2000 MHz are envisaged.

During their propagation in a propagation medium, signals are subject to interference from noise. As a result of diffraction and reflections, signal components flow over different propagation paths and are superimposed in the receiver, where they lead to mutual interference effects. Furthermore, if there is more than one signal source, the signals from these sources are superimposed. Frequency division multiplex (FDMA—frequency division multiple access), time division multiplex (TDMA—time division multiple access) or a method which is known as code division multiplex (CDMA—code division multiple access) are used to distinguish between the signal sources, and thus to evaluate the signals.

The GSM mobile radio system which is currently in existence is a wireless communications system using a TDMA component for subscriber separation (Time Division Multiple Access). Wanted information for the subscriber links is transmitted in time slots on the basis of a frame structure. Transmission takes place in blocks.

German patent application DE 195 49 148 discloses a mobile communications system which uses TDMA/CDMA subscriber separation (time division and code division multiple access) and uses a JD method (joint detection) at the receiving end in order to improve the detection of the transmitted wanted information on the basis of knowledge of the spread codes of a plurality of subscribers. Information from a plurality of wanted data links is transmitted simultaneously in one frequency channel (TCH traffic channel), and these links can be distinguished by their spread code.

German patent application DE 197 12 549 discloses the use of intelligent antennas (smart antennas) in order to increase the transmission capacity in the uplink (mobile to base station) direction. Various methods for space signal separation for the uplink (reverse—mobile to base station) and downlink (forward—base station to mobile) directions are known from Paulraj and Papadias, "Space-Time Processing For Wireless Communications," IEEE Signal Processing Magazine, November 1997, pages 49–83.

For the downlink direction, that is to say from the base station to the mobile, particular difficulties occur since the beam forming must be carried out before the transmitted signals have been influenced by the radio channel. Beam forming in the downlink direction is known from Schmalenberger and Blanz, "A Comparison Of Two Different Algorithms For Multi Antenna C/I Balancing," Proc. 2nd European Personal Mobile Communications Conference (EPMCC), Bonn, Germany, September 1997, pages 483–90, wherein a direct propagation path (line of sight) is assumed to exist between the radio stations involved, together with iterative calculation of beam forming vectors. Whenever the radio stations involved change, for example a link to or from a mobile station is set up or cleared, the entire calculation must be repeated.

2. Summary of the Invention

It is accordingly an object of the invention to provide an improved method and an improved base station for data transmission, which overcomes the above-mentioned disadvantages of the heretofore-known devices and methods of this general type and in which the computation complexity for beam forming is considerably reduced.

With the foregoing and other objects in view there is provided, in accordance with the invention, a signal transmission method in a wireless communications system of the type having a base station with an antenna device provided with and a plurality of antenna elements, and having a plurality of wireless stations, which method comprises:

defining space covariance matrices for a $k^{th}$ link from the base station to a wireless station and for a sum of further wireless stations;

defining a beam forming vector $w^{(k)}$ in accordance with the condition $$\left| \frac{w^{(k)} R_{xx}^{(k)} w^{(k)}}{w^{(k)} R_I^{(k)} w^{(k)}} \right|_{max}$$

having a greatest intrinsic value $\lambda_{max}^{(k)}$ in accordance with $$R_{xx}^{(k)} w^{(k)} = R_I^{(k)} w^{(k)} \lambda_{max}^{(k)}$$

for the link, where $R_{xx}$ and $R_I$ are the covariance matrices;

weighting transmission signals for the link with the beam forming vector; and transmitting the transmission signals with the antenna elements.

In other words, the novel method for data transmission is used in a radio communications system with a base station and further radio stations. The further radio stations may be mobile stations, for example in a mobile wireless network, or fixed stations, for example in so-called subscriber access networks for wire-free subscriber access.

In a first step, space covariance matrices are defined for a $k^{th}$ link from the base station to a wireless station and for a sum of signals of further radio stations, that is to say, in the latter case, the sum of the interference for the link k.

In a second step, a beam forming vector $w^{(k)}$ is calculated for the link in such a manner that the relationship $$\left| \frac{w^{(k)} R_{xx}^{(k)} w^{(k)}}{w^{(k)} R_I^{(k)} w^{(k)}} \right|$$

is maximized, wherein the generalized intrinsic vector $w^{(k)}$ is defined for the greatest generalized intrinsic value $\lambda_{max}^{(k)}$ by using $R_{xx}^{(k)} w^{(k)} = R_I^{(k)} w^{(k)} \lambda_{max}^{(k)}$.

Transmission signals for the link are then weighted with the beam forming vector, and are supplied to the antenna elements for transmission.

This method is used to maximize the power available for the link k in comparison with the interference power, in which case it is possible to dispense with iterations, since the use of the secondary condition $R_{xx}^{(k)}w^{(k)}=R_I^{(k)}w^{(k)}\lambda_{max}^{(k)}$ for the calculation leads to the desired result in one step. The computation complexity is thus drastically reduced. Particularly in scenarios having a large number of subscribers and severely fluctuating channel conditions, beam forming in the downlink direction is considerably more economic according to the invention.

In accordance with an added feature of the invention, a transmission power is defined for the transmission signals for the link from the beam forming vector in accordance with $P_k=w^{(k)H}w^{(k)}$, where H is a complex-conjugate vector and $P_k$ is the transmission power, and raising the transmission power to a predetermined minimum signal-to-noise ratio in the radio station. The transmission power is also raised to a predetermined minimum signal-to-noise ratio in the wireless station. The instantaneous signal-to-noise ratio is measured in the receiving wireless station and is reported to the base station, so that the latter can use an appropriate transmission power setting to guarantee the minimum signal-to-noise ratio.

In accordance with an additional feature of the invention, data are transmitted in an uplink direction and a downlink direction in a given frequency band, and at least one of the space covariance matrices with respect to the link for the downlink direction is defined from measured values from the uplink direction. The correspondence between the transmission and reception frequency which exists using TDD (time division duplex) is thus used to reliably define the space channel parameters. There is thus no need to estimate the incidence directions for TDD systems.

If, on the other hand, data are transmitted in the uplink and downlink directions in mutually different frequency bands, then at least one of the space covariance matrices is defined for the downlink direction from dominant incidence directions for received signals with respect to the link in the uplink direction. Reliable space channel parameters can also be determined and continuously updated for this case.

In accordance with a further feature of the invention, a unit matrix is set for the space covariance matrix from a sum of influences from further wireless stations. This simplifies the calculation once again, with the generalized intrinsic value problem thus being reduced to a normal intrinsic value problem.

In accordance with again an added feature of the invention, the space covariance matrices are defined based on estimated channel pulse responses. In accordance with a further development, the channel pulse responses are derived from training sequences transmitted by the wireless station. This leads to particularly high reliability in the definition of the space covariance matrices. Here, the channel measurements are evaluated in addition to obtaining space statements. The channel impulse responses are advantageously defined from training sequences which are transmitted by the radio station. The transmitted training sequences for one or more links are known in the receiving station, so that particularly reliable estimated values can be determined.

In accordance with again another feature of the invention, the method further comprises, in the base station or a wireless station, jointly detecting a plurality of signals differing by virtue of a CDMA code, and eliminating interference from signals not associated with the respective link. Joint detection of a plurality of signals which differ by virtue of a CDMA code, and for interference from signals which are not associated with the link to be eliminated, is particularly advantageous. The requirements for the signal-to-noise ratio are thus reduced, and the transmission power levels required for adequate transmission quality may be reduced.

In accordance with again an additional feature of the invention, the space covariance matrix is set up for a sum of the influences of further wireless stations from received signals of signals not associated with the respective link and/or by joint detection of signals not being considered in the wireless station, in accordance with $$E_I = \begin{bmatrix} e_I^{(1)T} \\ e_I^{(2)T} \\ \ldots \\ e_I^{(M)T} \end{bmatrix} \in C^{M \times W} \quad \text{and} \quad R_I^{(k)} = \frac{1}{W}E_I E_I^H$$

where M is a number of antenna elements in the antenna device and $R_I$ is the space covariance matrix.

With the above and other objects in view there is also provided, in accordance with the invention, a base station for data transmission in a wireless communications system with a plurality of wireless stations, comprising:

at least one transmitting device producing transmission signals;

an antenna device with a plurality of antenna elements connected to said transmitting device for transmitting transmission signals;

a control device connected to said transmitting device and a memory device connected to said control device, said control device being programmed:

to define space covariance matrices for a $k^{th}$ link from the base station to a wireless station and for a number of further radio stations, and to store the space covariance matrices in said memory device;

to define, for the respective link, a beam forming vector in accordance with the condition $$\left| \frac{w^{(k)}R_{xx}^{(k)}w^{(k)}}{w^{(k)}R_I^{(k)}w^{(k)}} \right|_{max}$$

having a greatest intrinsic value $\lambda_{max}^{(k)}$ in accordance with $$R_{xx}^{(k)}w^{(k)}=R_I^{(k)}w^{(k)}\lambda_{max}^{(k)}$$

and to store the beam forming vector in said memory device; and to control a weighting of the transmission signals for the respective link with the beam forming vector.

Other features which are considered as characteristic for the invention are set forth in the appended claims.

Although the invention is illustrated and described herein as embodied in a method and base station for data transmission in a radio communications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
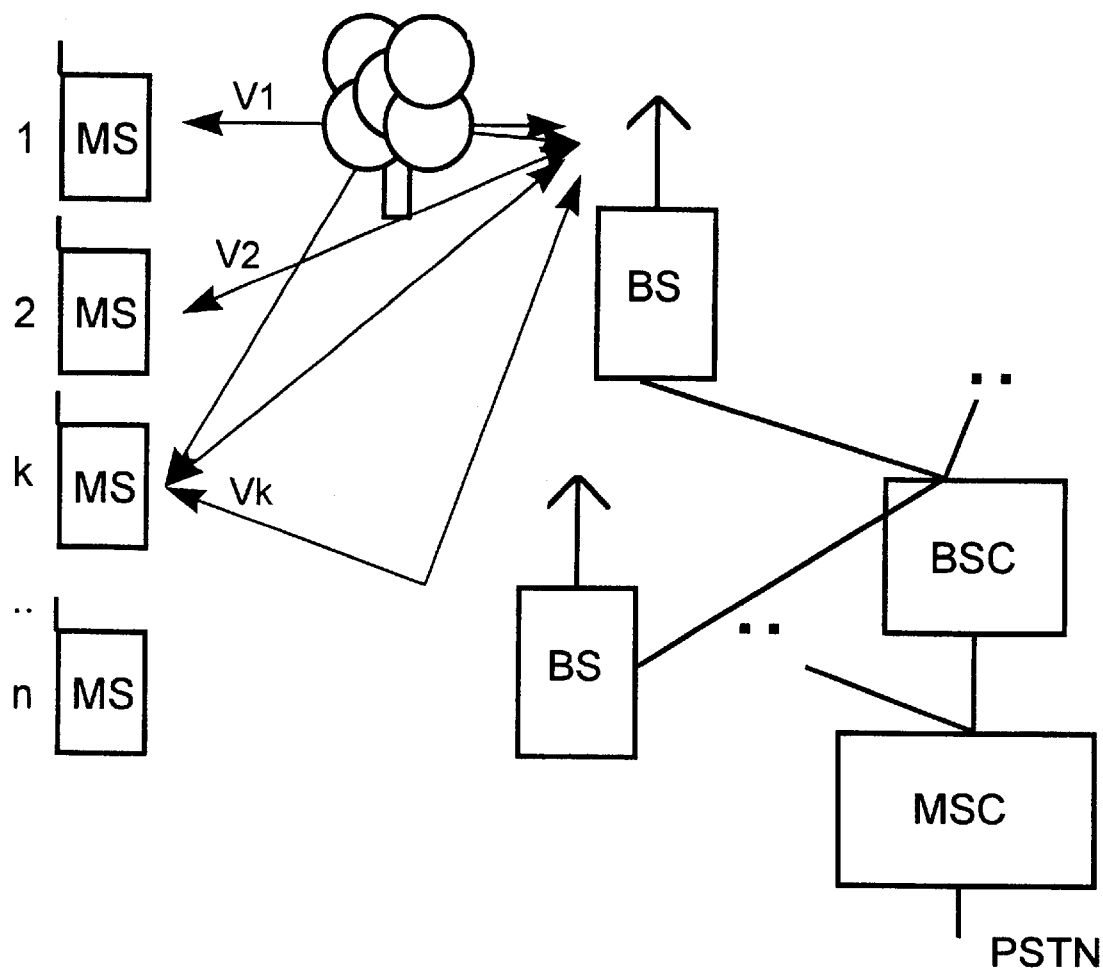
FIG. 1 is a diagrammatic block diagram of a mobile wireless network.

Referring now to the figures of the drawing in detail and first, particularly, to FIG. 1 thereof, there is seen a wireless communications system corresponding to GSM mobile radio network. The network comprises a large number of mobile switching centers MSC, which are networked with one another and produce access to a fixed network PSTN. Furthermore, these mobile switching centers MSC are each linked to at least one base station controller BSC. Each base station controller BSC in turn allows a link to be set up to at least one base station BS. Such a base station BS can set up an information link to mobile stations MS via a radio interface.

By way of example, FIG. 1 shows links V1, V2, Vk for transmitting wanted information and signaling information between mobile stations MS1, MS2, MSk, . . . MSn and a base station BS. An operation and maintenance center OMC provides the control and maintenance functions for the mobile radio network, or for parts of it. The functionality of this structure can be transferred to other radio communications systems in which the invention may be used, in particular for subscriber access networks using wireless subscriber connection.

Figure 2:
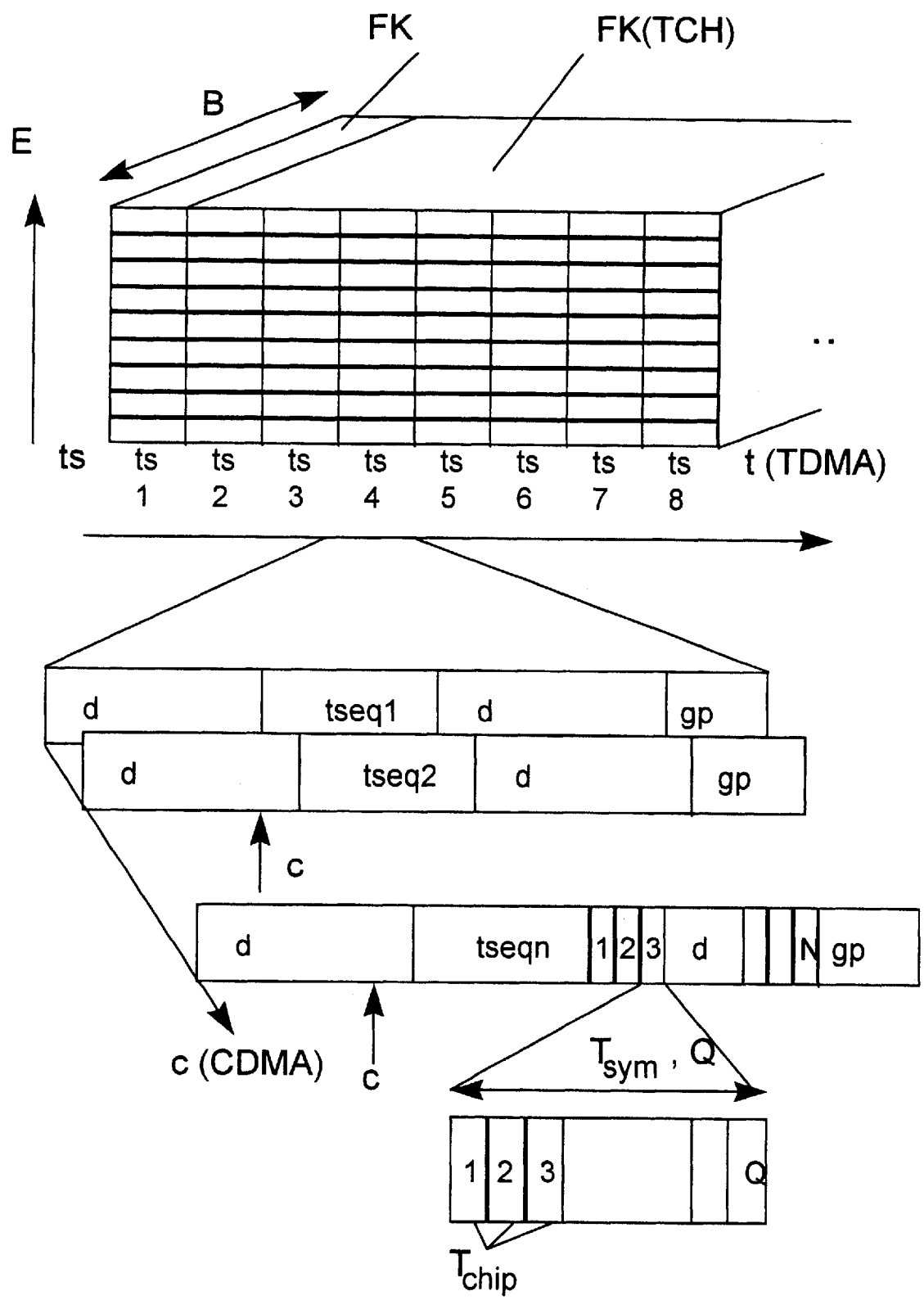
FIG. 2 is a schematic illustration of the frame structure for radio transmission.

The frame structure for radio transmission is shown in FIG. 2. A broadband frequency range, for example with a bandwidth of B=1.2 MHz, is split into a plurality of timeslots ts, for example 8 timeslots ts1 to ts8, in accordance with a TDMA component. Each timeslot ts within the frequency range B forms a frequency channel FK. Information from a plurality of links is transmitted in radio blocks within the frequency channels TCH, which are provided solely for wanted data transmission.

These radio blocks for wanted data transmission comprise sections with data d, in which sections with training sequences tseq1 to tseqn (which are known at the receiving end) are embedded. The data d are spread in a link-specific manner with a fine structure, a subscriber code c, so that, for example, n links can be separated by this CDMA component at the receiving end.

The spreading of individual symbols of data d results in Q chips of duration $T_{chip}$ being transmitted within the symbol duration $T_{sys}$. The Q chips in this case form the link-specific subscriber code c. Furthermore, a guard time gp is provided within the timeslot ts, in order to compensate for different signal propagation times of the links.

Within a broadband frequency range B, the successive timeslots ts are broken down in accordance with a frame structure. Thus, eight timeslots ts are combined to form a frame, with, for example, a timeslot ts4 in the frame forming a frequency channel for signaling FK or a frequency channel TCH for wanted data transmission, in which case the latter is used repeatedly by a group of links.

Figure 3:
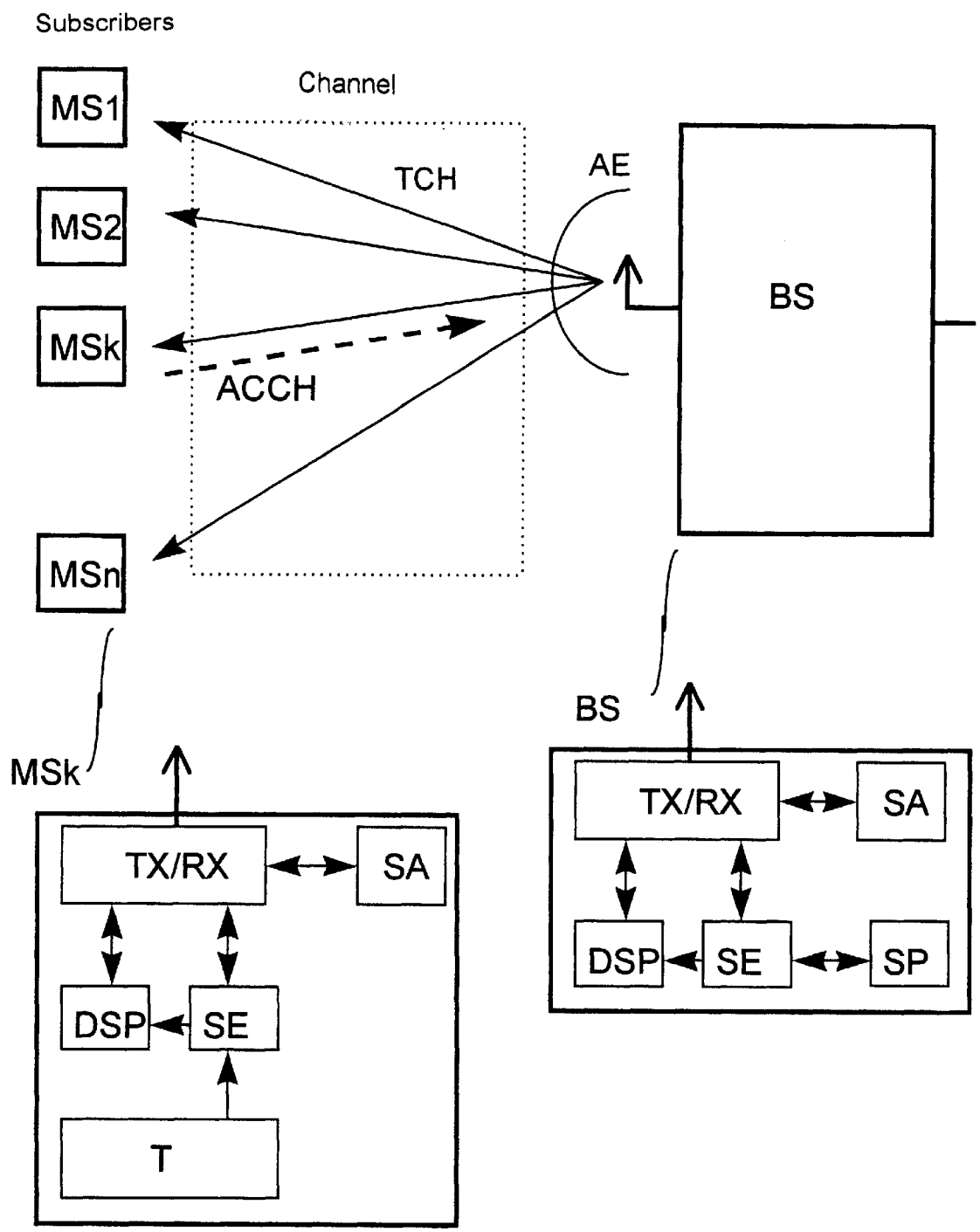
FIG. 3 is a block diagram showing the base station and mobile station.

FIG. 3 shows radio transmission in the downlink direction from the base station BS to mobile stations MS1 to MSn in a frequency channel TCH for data transmission. The mobile stations MS1 to MSn first of all define one or more frequency ranges B with a sufficiently high or maximum reception power. These are the frequency ranges B for the closest base station BS in whose cell the mobile station MS is currently located. This is how the base station MS and the mobile station MSk are associated.

The base station BS contains a transmitting/receiving device TX/RX which provides digital/analog conversion for the transmission signals to be transmitted, converts them from baseband to the frequency range B for transmission, and modulates and amplifies the transmission signals. A signal production device SA has previously combined the transmission signals into radio blocks, and allocated them to the corresponding frequency channel TCH. A signal processing device DSP evaluates signals received via the transmitting/receiving device TX/RX, and carries out channel estimation.

For signal processing, the received signals are converted into symbols using a discrete range of values, for example digitizers. A signal processing device DSP which, as a digital signal processor, contains a JD processor for detecting the wanted information and the signaling information using the JD-CDMA method (joint detection), also evaluates the data parts d. The interaction of the components is controlled by a control device SE. The data required for space subscriber separation by means of the associated antenna device AE are stored in a memory device SP.

In appropriately adapted form, the mobile station MSk contains the assemblies explained for the base station and, in addition, a control panel T. The subscriber can enter inputs on the control panel T, inter alia an input for activating the mobile station MS or for setting up a link Vk to the base station. The control device SE evaluates signals transmitted in the downlink direction and received by the mobile station MSk, defines the reception power and the current signal-to-noise ratio that is present, and initiates signaling to the base station BS using a signaling channel ACCH.

Figure 4:
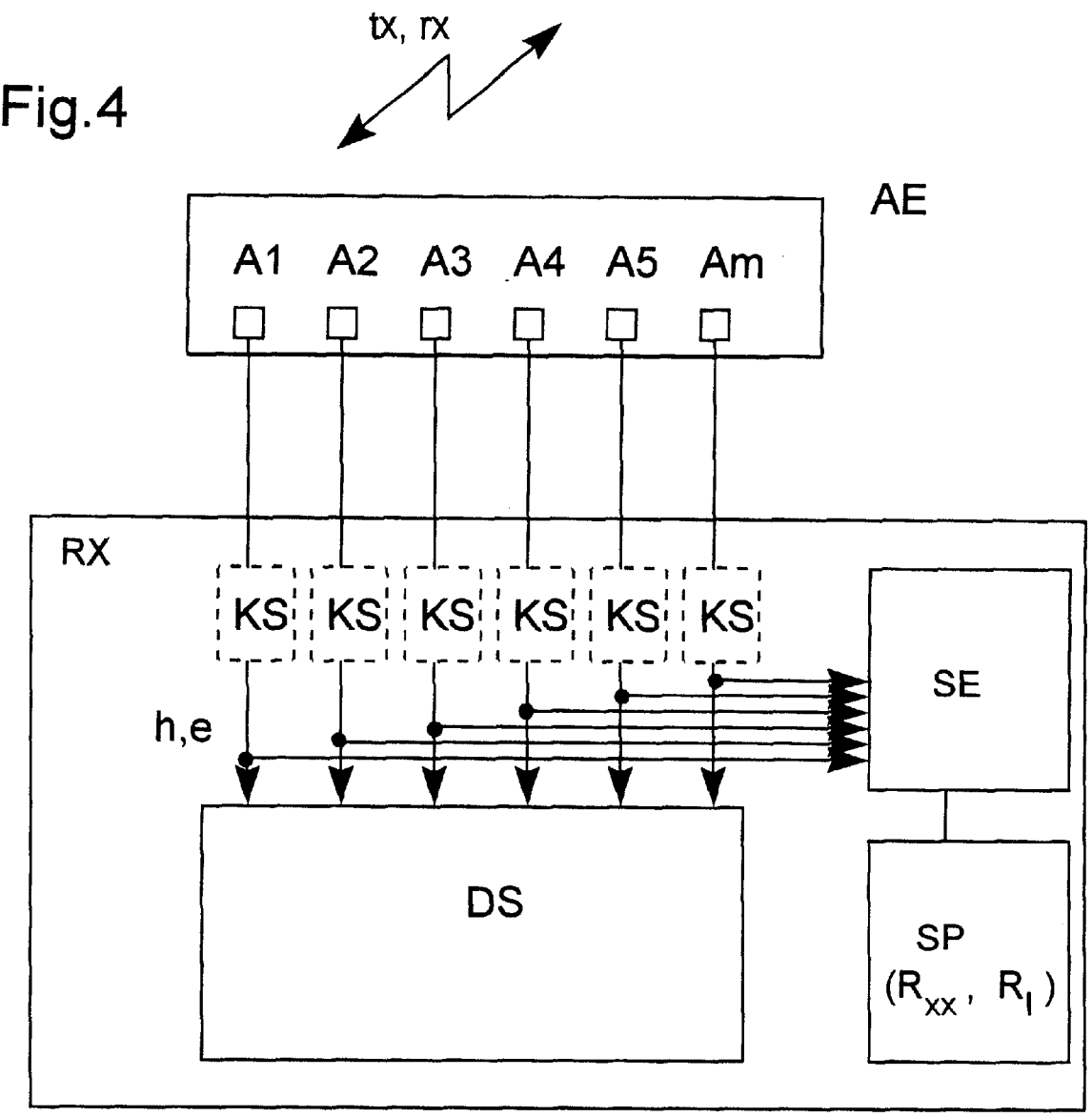
FIG. 4 is a block diagram of the antenna device and of the base station with regard to estimation of the space covariance matrices.

FIG. 4 shows the base station BS with the associated antenna elements A1 to Am of the antenna device AE (antenna array). This antenna device AE is associated with the base station BS and receives signals rx from the transmitting mobile stations MS in the mobile radio network, as well as transmitting signals tx to the receiving mobile stations MS.

The antenna elements A1 to Am form an antenna device AE which is designed as an intelligent antenna device, that is to say a plurality of antenna elements A1 to Am in this intelligent antenna device AE receive signals rx and transmit signals tx at the same time. The signals can be combined with one another in such a manner that the transmission quality is better than that with systems using one receiving antenna, and space resolution to increase the capacity is feasible.

Figure 6:
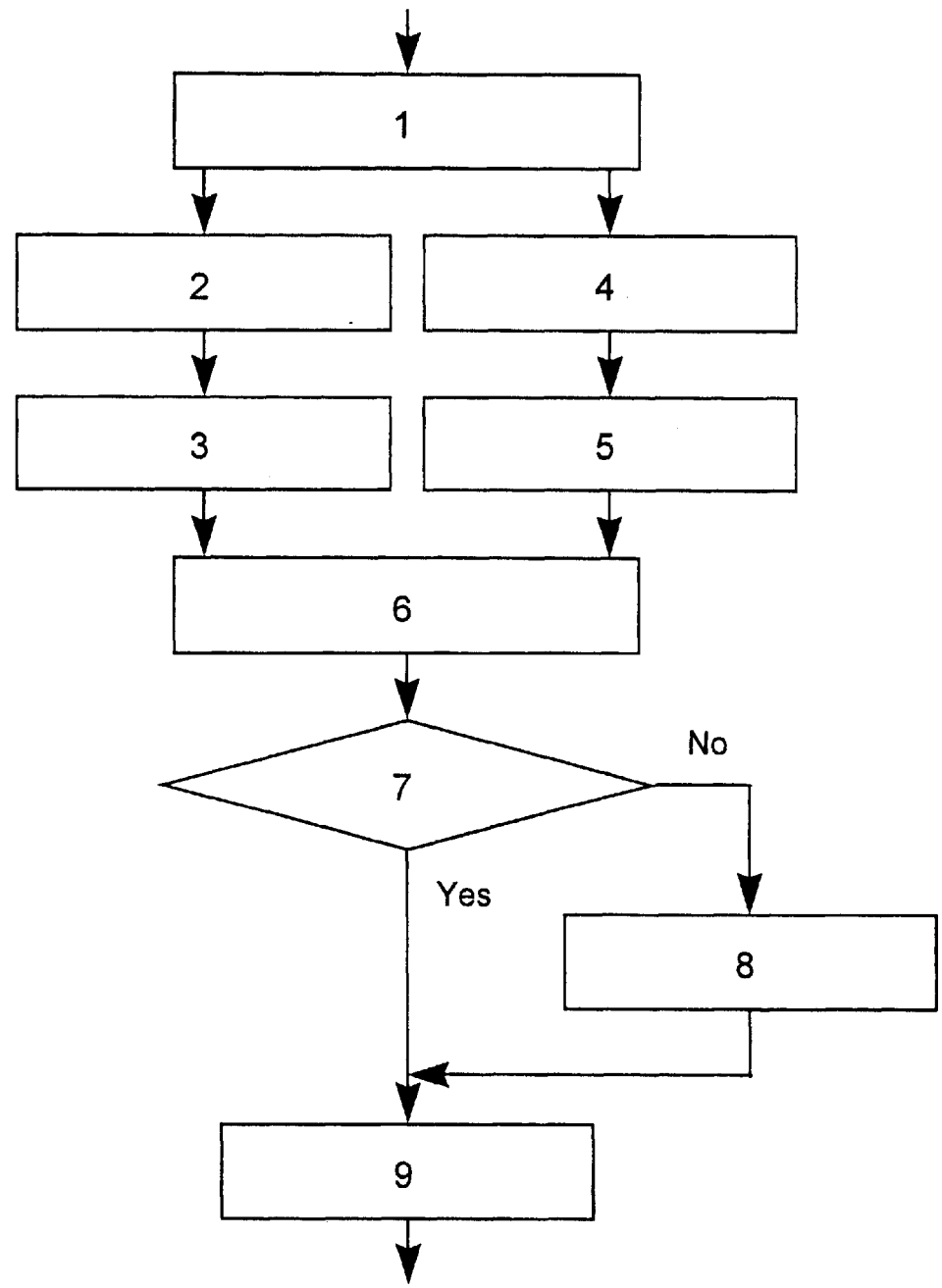
FIG. 6 shows a flowchart illustrating a beam forming process.

During reception, digital signals are produced from the received signals rx, for example by converting them to baseband followed by analog/digital conversion, and these digital signals are evaluated in the receiving device RX (step 1 in FIG. 6).

As part of the signal processing device DSP, the receiving device RX comprises a plurality of channel estimators KS and a data estimator DS, as well as the already mentioned control device SE and memory device SP. In addition, the receiving device RX has a-priori knowledge of the number K of subscribers, their training sequences tseq1, ..., tseqn (K≦n) and their subscriber code c, and may also have information relating to interference signals.

The channel pulse responses h, which are defined by the channel estimators KS using, for example, a Gaussian-Markov or maximum-likelihood estimation method based on the training sequences tseq1 to tseqn (step 2 in FIG. 6) and the received digital data symbols e are supplied to the data estimator DS for joint detection. Furthermore, the control device SE receives the channel impulse responses h and the received digital data symbols e in order to define space covariance matrices $R_{xx}$, $R_I$ for a $k^{th}$ link Vk and for the interference of the other links V1 to Vn and, if appropriate, of the known interference sources.

In TDD systems, the received signals can be defined directly, that is to say from $$H = \begin{bmatrix} h^{h(k,1)T} \\ h^{h(k,2)T} \\ \ldots \\ h^{h(k,M)T} \end{bmatrix} \in C^{M \times W}, \quad 1 \le k \le K$$

where M is the number of antenna elements, K is the number of active subscribers and H is the matrix of channel impulse responses h of length W. An estimated value for the space covariance matrix $R_{xx}$ for the link Vk is, for example, in accordance with $$R_{xx}^{(k)} = \frac{1}{W} \cdot H^{(k)} H^{(k)H}$$

(step 2 in FIG. 6). The value for $R_{xx}$ may in this case be averaged over a number of radio blocks by means of a rectangular or exponential window.

The training sequences tseq1 to tseqn are likewise used for the space covariance matrix $R_I$ for interference resulting from the interference sources and from the signals from the other links which (if JD is used) are not detected by joint detection in the mobile station MSk. In this case, the influences of the signals for the $k^{th}$ link and of the links which may be detected by joint detection in the mobile station MSk should be subtracted (step 4 in FIG. 6).

A vector can thus be set up for the signal received by the $m^{th}$ antenna element Am $e^{(m)} = [e_1^{(m)} \ e_2^{(m)} \ \ldots \ e_L^{(m)}]^T = e_{JD}^{(m)} + e_I^{(m)}$, $1 \le m \le M$, where L is the number of samples which are influenced solely by the training sequences, that is to say a number of samples may be ignored owing to interference with the preceding data symbols d. The vectors $e_{JD}^{(m)}$ and $e_I^{(m)}$ contain elements—JD—of those channel subscribers who are covered by the joint detection, and elements—I—of subscribers in adjacent cells.

If the training sequence tseqk of the $k^{th}$ subscriber, of length L+W−1 is denoted by $s_i^{(k)}$, then the vector $e_{JD}^{(m)}$ can be stated as follows:

$$e_{JD}^{(m)} = \sum_{k=1}^{K} \left( \begin{bmatrix} s_W^{(k)} & s_{W-1}^{(k)} & s_{W-2}^{(k)} & \cdots & s_1^{(k)} \\ s_{W+1}^{(k)} & s_W^{(k)} & s_{W-1}^{(k)} & \cdots & s_2^{(k)} \\ \ldots & \ldots & \ldots & \ldots & \ldots \\ s_{W+L-1}^{(k)} & s_{W+L-2}^{(k)} & s_{W+L-3}^{(k)} & \cdots & s_L^{(k)} \end{bmatrix} h^{(k,m)} \right)$$

The vector $e_I^{(m)}$ contains only elements of the interfering subscribers in the same frequency channel in adjacent cells, so that it can be said that:

$$e_I^{(m)} = e^{(m)} - e_{JD}^{(m)},$$

for each antenna element m, $1 \le m \le M$.

A vector $$E_I = \begin{bmatrix} e_I^{(1)T} \\ e_I^{(2)T} \\ \ldots \\ e_I^{(M)T} \end{bmatrix} \in C^{M \times W}$$

can thus be stated and the space covariance matrix $R_I$ can be stated as $$R_I^{(k)} = \frac{1}{W} \cdot E_I E_I^H$$

(step 5 in FIG. 6). This is optionally followed by averaging of the values over a number of radio blocks using a rectangular or exponential window.

In FDD systems (frequency division duplex), the space covariance matrices $R_{xx}$, $R_I$ for the downlink direction are estimated from specific dominant incidence directions and the corresponding amplitudes in the uplink direction.

For example, the matrix $R_{xx}$ results from:

$$R_{xx}^{(k)} = \sum_{i=1}^{d(k)} p_i^{(k)} \cdot a(\mu_i^{(k)}) a^H(\mu_i^{(k)})$$

where $d_f(k)$ is the number of dominant incidence directions for the $k^{th}$ subscriber (estimated from the uplink direction), $\mu_i^{(k)}$ is a vector with the 1D or 2D spatial frequencies of the $i^{th}$ propagation path, $a(\mu_i^{(k)})$ is the corresponding control vector (array steering vector) for the antenna device AE, and $p_{Ii}$ is the complex amplitude (estimated from the uplink direction).

The matrix $R_I$ thus becomes:

$$R_I^{(k)} = \sum_{i=1}^{d_I(k)} p_{I_i}^{(k)} \cdot a(\mu_{I_i}^{(k)}) a^H(\mu_{I_i}^{(k)})$$

where $d_I(k)$ is the number of dominant incidence directions of the interfering signals (estimated from the uplink direction), $\mu_{I_i}^{(k)}$ is a vector with the 1D or 2D spatial frequencies of the $i^{th}$ propagation path of the interference sources, $a(\mu_{I_i}^{(k)})$ is the corresponding control vector (array steering vector) for the antenna device AE, and $P_{Ii}$ is the complex amplitude (estimated from the uplink direction).

This procedure corresponds to steps 2 and 3 as well as 4 and 5, respectively, in FIG. 6.

As an alternative to the described TDMA/CDMA radio interface, the method according to the invention can also be applied to DS (direct sequence) CDMA transmission systems. In order to estimate the space covariance matrices $R_{xx}$, $R_I$, the channel impulse responses in the uplink direction are evaluated in this case, or 2D rake receivers with MVDR processing (minimum variance distortionless response) are used.

In a further step (step 6 in FIG. 6), a beam forming vector $w^{(k)}$ is calculated for the $k^{th}$ link in accordance with the equation:

$$\left|\frac{w^{(k)}R_{xx}^{(k)}w^{(k)}}{w^{(k)}R_I^{(k)}w^{(k)}}\right|_{max}$$

where $w^{(k)}$ is the generalized intrinsic vector relating to the largest generalized intrinsic value $\lambda^{(k)}_{max}$ in accordance with $$R_{xx}^{(k)}w^{(k)}=R_I^{(k)}w^{(k)}\lambda_{max}^{(k)}$$

This corresponds to a general intrinsic value problem, which can also be simplified by using a standard matrix I for $R_I$. The calculation is carried out without iterations.

The transmission power for the transmission signals tx for the link k is defined from the beam forming vector $w^{(k)}$ in accordance with the relationship $P_k=w^{(k)H}w^{(k)}$, where H denotes a complex-conjugate vector.

In step 7 in FIG. 6, a check is carried out to determine whether the signal-to-noise ratio at the mobile station MSk is adequate. If this is not the case, then the transmission power $P_k$ is also raised to a predetermined minimum signal-to-noise ratio in the radio station. The instantaneous signal-to-noise ratio is measured in the receiving radio station, and is reported to the base station.

Transmission signals for the link are then weighted with the beam forming vector $w^{(k)}$ and are supplied to the antenna elements for transmission (step 9 in FIG. 6).

Figure 5:
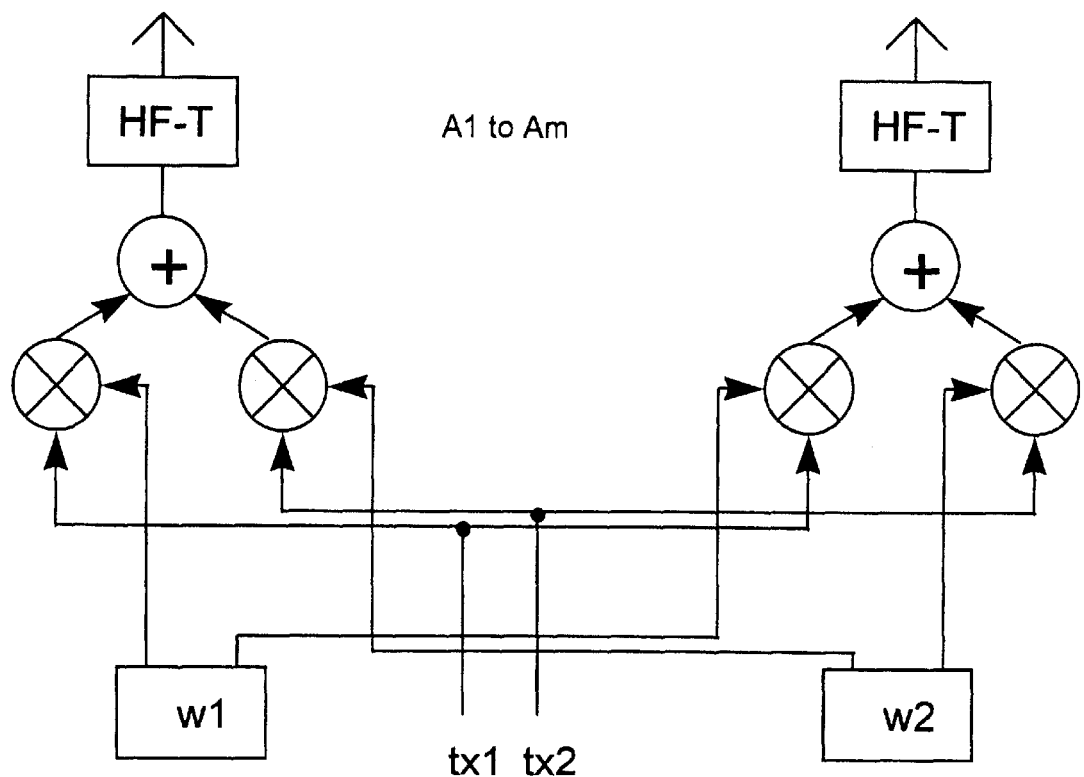
FIG. 5 shows a block diagram of a beam forming network.

A network for beam forming is shown by way of example in FIG. 5 for two links with transmission signals tx1 and tx2. The links are allocated beam forming vectors w1 and w2, which are multiplied by the transmission signals tx1 and tx2, with the weighted transmission signals tx1 and tx2 being superimposed for each individual antenna element, are converted into radio-frequency transmission signals in an HF section HF-T, and are then transmitted via m individual antenna elements. The transmission signals tx1 and tx2 are transmitted in the same frequency channel (at the same transmission frequency, possibly in the same timeslot and/or with the same code), and are only spatially separated.

The use of different beam forming vectors w1, w2 for the various links results in the antenna device AE having a transmission characteristic which ensures undisturbed reception of the transmission signals tx1, tx2 at the corresponding positions of the mobile stations MS1, MSk.

I claim:

1. A signal transmission method in a wireless communications system of the type having a base station with an antenna device provided with and a plurality of antenna elements, and having a plurality of wireless stations, which method comprises:

defining space covariance matrices for a $k^{th}$ link from the base station to a first wireless station, and for a sum of further wireless stations by setting up the space covariance matrix for a sum of the influences of further wireless stations from received signals of signals not associated with the respective link and by joint detection of signals not being considered in the first wireless station, in accordance with $$E_I = \begin{bmatrix} e_I^{(1)T} \\ e_I^{(2)T} \\ \ldots \\ e_I^{(M)T} \end{bmatrix} \in C^{M \times W} \quad \text{and} \quad R_I^{(k)} = \frac{1}{W}E_I E_I^H$$

where M is a number of antenna elements in the antenna device and $R_I$ is the space covariance matrix;

defining a beam forming vector $w^{(k)}$ in accordance with the condition $$\left|\frac{w^{(k)}R_{xx}^{(k)}w^{(k)}}{w^{(k)}R_I^{(k)}w^{(k)}}\right|_{max}$$

having a greatest intrinsic value $\lambda_{max}^{(k)}$ in accordance with $$R_{xx}^{(k)}w^{(k)}=R_I^{(k)}w^{(k)}\lambda_{max}^{(k)}$$

for the link, where $R_{xx}$ and $R_I$ are the covariance matrices;

weighting transmission signals for the link with the beam forming vector; and transmitting the transmission signals with the antenna elements.

2. The method according to claim 1, which comprises defining a transmission power for the transmission signals for the link from the beam forming vector in accordance with $P_k=w^{(k)H}w^{(k)}$, where H is a complex-conjugate vector and $P_k$ is the transmission power, and raising the transmission power to a predetermined minimum signal-to-noise ratio in the radio station.

3. The method according to claim 1, which comprises transmitting data in an uplink direction and a downlink direction in a given frequency band, and defining at least one of the space covariance matrices with respect to the link for the downlink direction from measured values from the uplink direction.

4. The method according to claim 1, which comprises transmitting data in an uplink direction and a downlink direction in mutually different frequency bands, and defining at least one of the space covariance matrices for the downlink direction from dominant incidence directions for received signals with respect to the link in the uplink direction.

5. The method according to claim 1, which comprises setting a unit matrix for the space covariance matrix from a sum of influences from further radio stations.

6. The method according to claim 1, wherein the step of defining the space covariance matrices comprises defining the covariance matrices based on estimated channel pulse responses.

7. The method according to claim 6, which further comprises defining the channel pulse responses from training sequences transmitted by the wireless station.

8. The method according to claim 1, which comprises, in one of the base station and a wireless station, jointly detecting a plurality of signals differing by virtue of a CDMA code, and eliminating interference from signals not associated with the respective link.

9. A base station for data transmission in a wireless communications system with a plurality of wireless stations, comprising:

at least one transmitting device producing transmission signals;

an antenna device with a plurality of antenna elements connected to said transmitting device for transmitting transmission signals;

a control device connected to said transmitting device and a memory device connected to said control device, said control device being programmed:

to define space covariance matrices for a $k^{th}$ link from the base station to a first wireless station and for a number of further radio stations, and to store the space covariance matrices in said memory device;

to set up the space covariance matrix for a sum of the influences of further wireless stations from received signals of signals not associated with the respective link and by joint detection of signals not being considered in the first wireless station, in accordance with $$E_I = \begin{bmatrix} e_I^{(1)T} \\ e_I^{(2)T} \\ \ldots \\ e_I^{(M)T} \end{bmatrix} \in C^{M \times W} \quad \text{and} \quad R_I^{(k)} = \frac{1}{W} E_I E_I^H$$

where M is a number of antenna elements in the antenna device and $R_I$ is the space covariance matrix;

to define, for the respective link, a beam forming vector in accordance with the condition $$\left| \frac{w^{(k)} R_{xx}^{(k)} w^{(k)}}{w^{(k)} R_I^{(k)} w^{(k)}} \right|_{max}$$

having a greatest intrinsic value $\lambda_{max}^{(k)}$ in accordance with $$R_{xx}^{(k)} w^{(k)} = R_I^{(k)} w^{(k)} \lambda_{max}^{(k)}$$

and to store the beam forming vector in said memory device; and to control a weighting of the transmission signals for the respective link with the beam forming vector.

10. A signal transmission method in a wireless communications system of the type having a base station with an antenna device provided with and a plurality of antenna elements, and having a plurality of wireless stations, which method comprises:

defining space covariance matrices for a $k^{th}$ link from the base station to a first wireless station, and for a sum of further wireless stations by setting up the space covariance matrix for a sum of the influences of further wireless stations from received signals of signals not associated with the respective link in accordance with $$E_I = \begin{bmatrix} e_I^{(1)T} \\ e_I^{(2)T} \\ \ldots \\ e_I^{(M)T} \end{bmatrix} \in C^{M \times W} \quad \text{and} \quad R_I^{(k)} = \frac{1}{W} E_I E_I^H$$

where M is a number of antenna elements in the antenna device and $R_I$ is the space covariance matrix;

defining a beam forming vector $w^{(k)}$ in accordance with the condition $$\left| \frac{w^{(k)} R_{xx}^{(k)} w^{(k)}}{w^{(k)} R_I^{(k)} w^{(k)}} \right|_{max}$$

having a greatest intrinsic value $\lambda_{max}^{(k)}$ in accordance with $$R_{xx}^{(k)} w^{(k)} = R_I^{(k)} w^{(k)} \lambda_{max}^{(k)}$$

for the link, where $R_{xx}$ and $R_I$ are the covariance matrices;

weighting transmission signals for the link with the beam forming vector; and transmitting the transmission signals with the antenna elements.

11. A signal transmission method in a wireless communications system of the type having a base station with an antenna device provided with and a plurality of antenna elements, and having a plurality of wireless stations, which method comprises:

defining space covariance matrices for a $k^{th}$ link from the base station to a first wireless station, and for a sum of further wireless stations by setting up the space covariance matrix for a sum of the influences of further wireless stations from received signals by joint detection of signals not being considered in the first wireless station, in accordance with $$E_I = \begin{bmatrix} e_I^{(1)T} \\ e_I^{(2)T} \\ \ldots \\ e_I^{(M)T} \end{bmatrix} \in C^{M \times W} \quad \text{and} \quad R_I^{(k)} = \frac{1}{W} E_I E_I^H$$

where M is a number of antenna elements in the antenna device and $R_I$ is the space covariance matrix;

defining a beam forming vector $w^{(k)}$ in accordance with the condition $$\left| \frac{w^{(k)} R_{xx}^{(k)} w^{(k)}}{w^{(k)} R_I^{(k)} w^{(k)}} \right|_{max}$$

having a greatest intrinsic value $\lambda_{max}^{(k)}$ in accordance with $$R_{xx}^{(k)} w^{(k)} = R_I^{(k)} w^{(k)} \lambda_{max}^{(k)}$$

for the link, where $R_{xx}$ and $R_I$ are the covariance matrices;

weighting transmission signals for the link with the beam forming vector; and transmitting the transmission signals with the antenna elements.

12. A base station for data transmission in a wireless communications system with a plurality of wireless stations, comprising:

at least one transmitting device producing transmission signals;

an antenna device with a plurality of antenna elements connected to said transmitting device for transmitting transmission signals;

a control device connected to said transmitting device and a memory device connected to said control device, said control device being programmed:

to define space covariance matrices for a $k^{th}$ link from the base station to a first wireless station and for a number of further radio stations, and to store the space covariance matrices in said memory device;

to set up the space covariance matrix for a sum of the influences of further wireless stations from received signals of signals not associated with the respective link in accordance with $$E_I = \begin{bmatrix} e_I^{(1)T} \\ e_I^{(2)T} \\ \ldots \\ e_I^{(M)T} \end{bmatrix} \in C^{M \times W} \quad \text{and} \quad R_I^{(k)} = \frac{1}{W} E_I E_I^H$$

where M is a number of antenna elements in the antenna device and $R_I$ is the space covariance matrix;

to define, for the respective link, a beam forming vector in accordance with the condition $$\left| \frac{w^{(k)} R_{xx}^{(k)} w^{(k)}}{w^{(k)} R_I^{(k)} w^{(k)}} \right|_{max}$$

having a greatest intrinsic value $\lambda_{max}^{(k)}$ in accordance with $$R_{xx}^{(k)} w^{(k)} = R_I^{(k)} w^{(k)} \lambda_{max}^{(k)}$$

and to store the beam forming vector in said memory device; and to control a weighting of the transmission signals for the respective link with the beam forming vector.

13. A base station for data transmission in a wireless communications system with a plurality of wireless stations, comprising:

at least one transmitting device producing transmission signals;

an antenna device with a plurality of antenna elements connected to said transmitting device for transmitting transmission signals;

a control device connected to said transmitting device and a memory device connected to said control device, said control device being programmed:

to define space covariance matrices for a $k^{th}$ link from the base station to a first wireless station and for a number of further radio stations, and to store the space covariance matrices in said memory device;

to set up the space covariance matrix for a sum of the influences of further wireless stations from received signals by joint detection of signals not being considered in the first wireless station, in accordance with $$E_I = \begin{bmatrix} e_I^{(1)T} \\ e_I^{(2)T} \\ \ldots \\ e_I^{(M)T} \end{bmatrix} \in C^{M \times W} \quad \text{and} \quad R_I^{(k)} = \frac{1}{W} E_I E_I^H$$

where M is a number of antenna elements in the antenna device and $R_I$ is the space covariance matrix;

to define, for the respective link, a beam forming vector in accordance with the condition $$\left| \frac{w^{(k)} R_{xx}^{(k)} w^{(k)}}{w^{(k)} R_I^{(k)} w^{(k)}} \right|_{max}$$

having a greatest intrinsic value $\lambda_{max}^{(k)}$ in accordance with $$R_{xx}^{(k)} w^{(k)} = R_I^{(k)} w^{(k)} \lambda_{max}^{(k)}$$

and to store the beam forming vector in said memory device; and to control a weighting of the transmission signals for the respective link with the beam forming vector.

* * * * *